(12) United States Patent
Asic et al.

(10) Patent No.: US 6,712,383 B2
(45) Date of Patent: Mar. 30, 2004

(54) AIRBAG MODULE FOR MOTOR VEHICLES

(75) Inventors: Sabina Asic, Wuppertal (BA); Jens Hannemann, Wuppertal (DE); Axel Niedergesaess, Osnabrueck (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/995,248

(22) Filed: Nov. 27, 2001

(65) Prior Publication Data

US 2002/0117836 A1 Aug. 29, 2002

(30) Foreign Application Priority Data

Nov. 27, 2000 (DE) .......................................... 100 58 740

(51) Int. Cl.$^7$ .............................................. B60R 21/16
(52) U.S. Cl. ..................................... 280/728.2; 280/731
(58) Field of Search ................................ 280/728.2, 731

(56) References Cited

U.S. PATENT DOCUMENTS

| | | | | |
|---|---|---|---|---|
| 5,186,490 A | * | 2/1993 | Adams et al. ............... | 280/731 |
| 5,314,203 A | * | 5/1994 | Adams et al. ............. | 280/728.2 |
| 6,196,573 B1 | * | 3/2001 | Worrell et al. ........... | 280/728.2 |
| 6,325,411 B1 | * | 12/2001 | Rigner et al. ................ | 280/731 |
| 6,354,622 B1 | * | 3/2002 | Ulbrich et al. ............... | 280/731 |
| 6,361,065 B1 | * | 3/2002 | Frisch ...................... | 280/728.2 |
| 6,422,600 B1 | * | 7/2002 | Crohn et al. ................. | 280/740 |
| 6,435,540 B1 | * | 8/2002 | Durre ....................... | 280/728.2 |
| 6,439,599 B1 | * | 8/2002 | Laue et al. .................. | 280/731 |
| 2001/0048216 A1 | * | 12/2001 | Varcus et al. ............. | 280/728.2 |

FOREIGN PATENT DOCUMENTS

EP 1010589 A2 * 12/1998
GB 2325900 * 12/1998

* cited by examiner

Primary Examiner—Paul N. Dickson
Assistant Examiner—George D Spisich
(74) Attorney, Agent, or Firm—Scott A. McBain

(57) ABSTRACT

The invention relates to an airbag module for motor vehicles comprising a housing for an inflatable airbag and a gas generator which is connected to a base element fixed to the module in the assembled state, with the gas generator and the base element being combined to form an assembly serving as a vibration absorber and being unreleasably connected to one another by at least one elastic and/or vibration damping coupling element via which the gas generator is supported over its area at the base element.

22 Claims, 6 Drawing Sheets

Figure 1A:
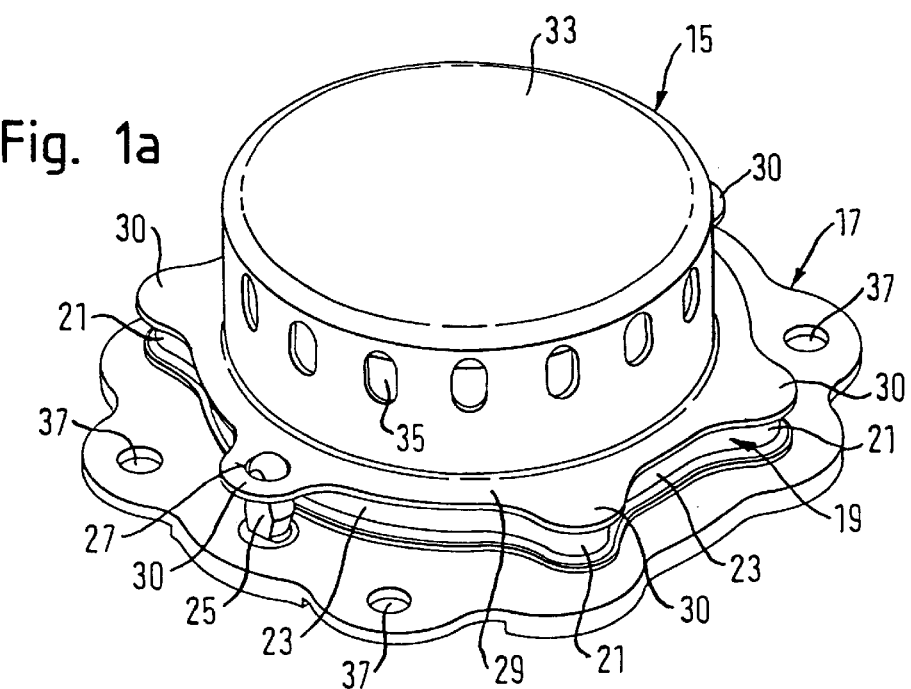

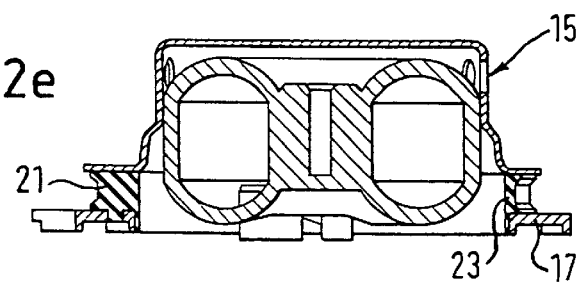
Fig. 2e
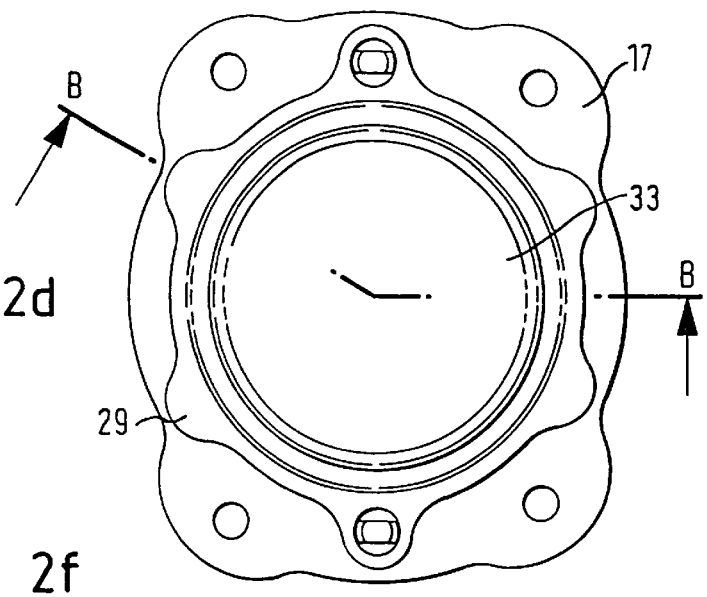
Fig. 2d
Fig. 2f
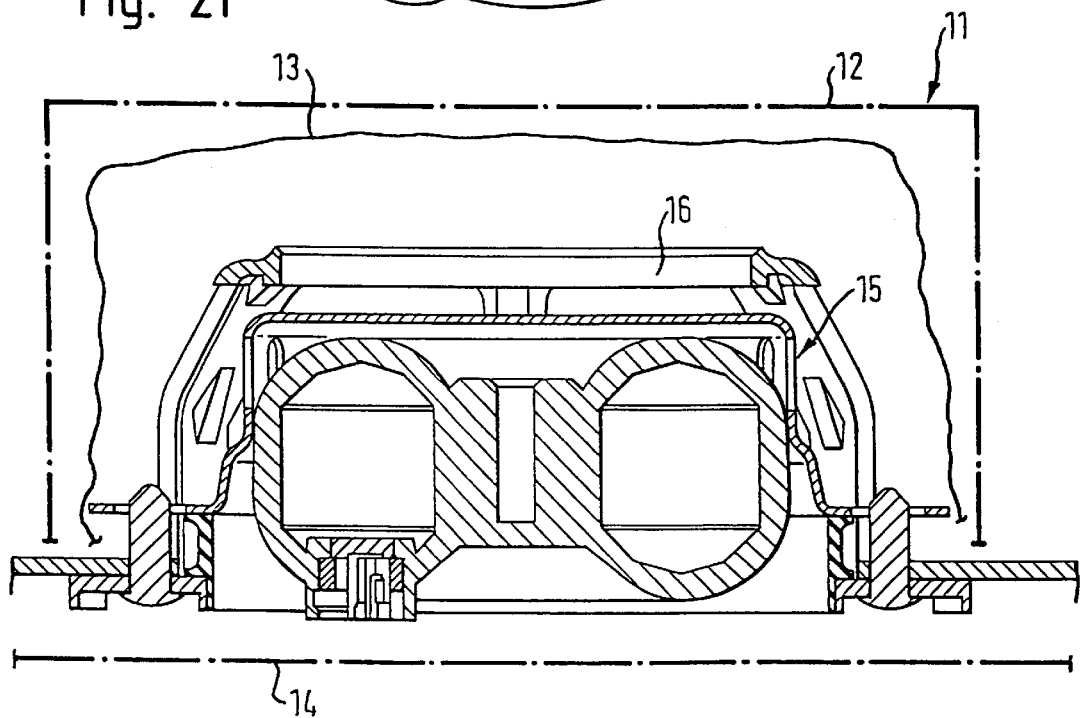

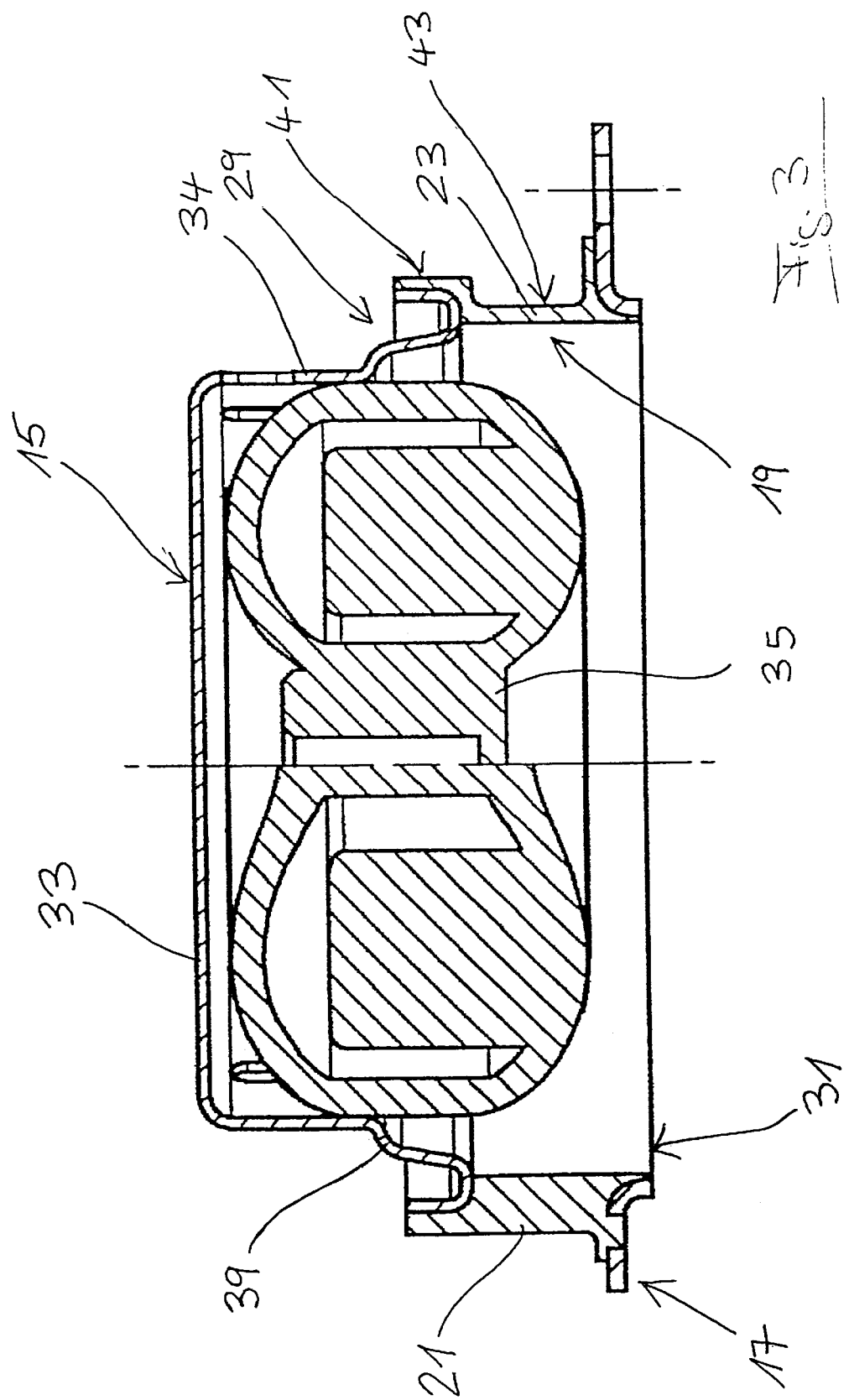

AIRBAG MODULE FOR MOTOR VEHICLES

The invention relates to an airbag module for motor vehicles having a housing for an inflatable airbag and a gas generator.

Such airbag modules serve to receive the airbag in the folded state and to inflate it by means of the gas generator in the case of a crash. The airbag modules are installed in the vehicle as a unit. It is a problem, in particular with driver airbags to be installed at the steering wheel, that vibrations which occur during the operation of the vehicle can be transmitted to the steering wheel unit and thus to the airbag module.

It is the underlying problem (object) of the invention to provide an airbag module of the kind initially mentioned which has as simple a construction as possible and which is not impaired by vibrations which occur and which can be used in particular as a driver airbag which can be integrated into a steering wheel unit.

This object is satisfied by the features of claim 1 and in particular by the gas generator being connected to a base element fixed to the module in the assembled state, with the gas generator and the base element being combined to form an assembly serving as a vibration absorber and being unreleasably connected to one another by at least one elastic and/or vibration damping coupling element via which the gas generator is supported over its area at the base element.

In accordance with the invention, the gas generator, which has a comparatively large mass, is used as a vibration damper. It is of particular advantage that the gas generator and the base element, which form the vibration absorber assembly together with the coupling element and which are unreleasably connected to one another by the coupling element, are used as a unit and can be commonly integrated into the module when the airbag module is assembled. The manufacture of the airbag module is made substantially simpler in this way. In particular, additional measures to hold the unit of gas generator, base element and coupling element together are superfluous due to the unreleasability of the connection made between the gas generator and the base element by the coupling element. The areal support of the gas generator means that the coupling element serves as an elastic and/or vibration damping base component, i.e. the base element and the coupling element jointly form a base assembly for the gas generator which is able to damp or decrease vibrations. Furthermore, the stress of the coupling element with respect to a coupling element formed, for example, as an elastic suspension can be reduced by the coupling element serving as a support for the gas generator. Damage to the coupling element caused in particular by material fatigue can be prevented in this way in accordance with the invention. It is moreover of advantage that the installation procedure and the installation position of the assembly with respect to a fixed tying of the gas generator practically do not need to be changed due to the invention.

It is particularly preferred if the base element, the coupling element and the gas generator at least regionally form a sandwich-like assembly.

In a further practical embodiment of the invention, it is provided that the coupling element is vulcanized both to the gas generator and to the base element.

This connecting of the coupling element to the gas generator and to the base element, which is free of securing means, but which is nevertheless stable and secure, allows a simple manufacture and handling of the vibration absorber. Moreover, in this way, a gas-tight connection of the gas generator to the base element and thus to the airbag module can be simply ensured with the coupling element.

The coupling element consists for example of rubber or a rubber-like material.

In accordance with the invention, other materials can generally be used for the coupling element and/or in particular different ways of securing the coupling element to the gas generator and to the base element can be used.

It is particularly preferred for the coupling element to have a higher stiffness parallel to a longitudinal module axis than perpendicular to the longitudinal module axis. This embodiment is in particular advantageous for airbag systems which can be integrated into steering wheel units.

In accordance with a further preferred embodiment of the invention, the coupling element has a closed peripheral contour and is in particular of an annular shape.

The coupling element can simultaneously carry out a plurality of functions by this embodiment in that it, on the one hand, provides an elastic connection of the gas generator to the base element and, on the other hand, ensures the gas-tightness between the gas generator and the base element.

In a preferred variant of the invention, the coupling element can have a wall thickness which varies in the peripheral direction. A particularly preferred embodiment provides that the coupling element has contact regions with a relatively large wall thickness distributed in the peripheral direction and sealing regions with a relatively small wall thickness between the contact regions, with the contact regions, which serve as elastic coupling bases and, for example, have an at least approximately circular or semi-circular contact area, providing a sufficient stability and stiffness of the connection, while the wall regions extending between these contact bases substantially carry out a sealing function. The coupling element and thus the absorber assembly can be directly matched to the respective demands by a corresponding dimensioning, in particular of the contact regions.

In a particularly preferred embodiment of the invention, the coupling element is formed as a radial vibration limiter for the gas generator, with the coupling element not only serving for the support of the gas generator at the base element, but simultaneously fulfilling a vibration limitation function in the radial direction. Additional measures such as separate vibration limiters are hereby not necessary. The manufacture of the airbag module can be substantially simplified in this manner since care only has to be taken for the connection of the coupling element to the gas generator and to the base element and in this manner care is already taken for a secure support of the gas generator at the base element and a limitation of radial vibrations of the gas generator, or vibrations of the gas generator perpendicular to a longitudinal module axis, is also ensured.

It is preferred for the coupling element and the gas generator to mutually overlap in the axial direction—with respect to a longitudinal module axis. In this respect, the gas generator can contact the coupling element directly in an areal manner in the radial direction, with preferably a radially outer surface of the gas generator being fixedly connected, in particular by vulcanization, to the coupling element or to a radially outwardly lying section of the coupling element.

In accordance with a particularly preferred practical embodiment, the gas generator is inserted into the coupling element and is surrounded at least regionally by the coupling element. A particularly stable connection is hereby realized between the gas generator and the coupling element.

It is particularly preferred for the coupling element to be formed in step shape at least regionally for the simultaneous axial and radial support of the gas generator.

The coupling element can have a peripheral support step for the gas generator at its radial inner side.

The gas generator can be placed onto a step-shaped section or a support step of the coupling element and can simultaneously be fixedly connected to the coupling element, in particular by vulcanization, via a lower and a radially outer or inner surface.

The coupling element preferably has two annular sections radially offset with respect to one another in order to form a support step for the gas generator.

It is further proposed for the coupling element to have reinforcement regions distributed in the circumferential direction in which the wall thickness of the coupling element is enlarged in comparison with regions disposed between the reinforcement regions in particular in the region of an upper and/or of a lower annular section.

The gas generator can have a collar for the support of the coupling element which is preferably formed at least approximately in a U shape in cross-section.

It is preferred in this respect for the collar to be arranged in a manner radially outwardly offset and in particular to merge via a step-shaped transition section into a side wall of the gas generator which preferably extends axially.

In accordance with a further preferred embodiment of the invention, at least one preferably separate vibration limiter is additionally provided for the gas generator and is preferably made of an elastic material. The vibration limiter can have a greater stiffness than the coupling element at least perpendicular to a longitudinal module axis. A plurality of such vibration limiters are preferably provided.

Relative movements between the gas generator and the base element, which the coupling element permits due to its design, can be limited by the vibration limiter(s). The coupling element can thereby be optimized with respect to its vibration damping function without having to meet any certain marginal conditions with respect to protection due to possible movements of the gas generator. In particular, such relative movements can be suppressed by the additional vibration limiters where, without this preferred embodiment of the invention, the danger would arise that the coupling element would be released from the gas generator or from the base element or that the coupling element would tear.

The vibration limiters are preferably formed with a pin shape and preferably extend approximately parallel to a longitudinal module axis of the gas generator.

It is furthermore preferred for the vibration limiters each to be fixed at the base element with one end and to engage into a recess of the gas generator with another.

The invention moreover relates to a method for the manufacture of an airbag module for motor vehicles comprising a housing for an inflatable airbag and a gas generator in which an assembly serving as a vibration absorber is manufactured by a coupling element being unreleasably connected both to the gas generator and to a base element and by the assembly being integrated into the airbag module as a unit.

Further improved embodiments of the invention are also given in the dependent claims, the description and the drawing.

Figure 1B:
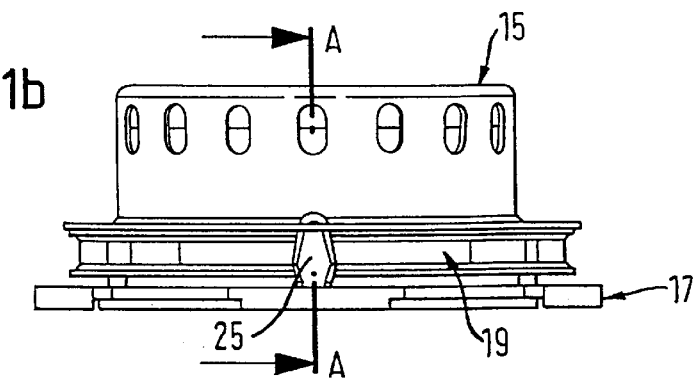
Figure 1C:
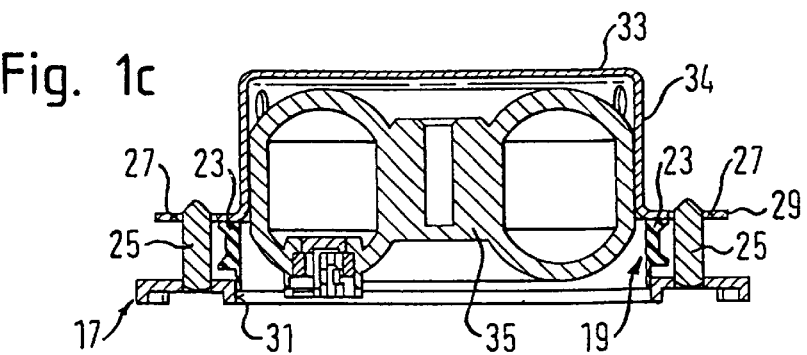
Figure 1E:
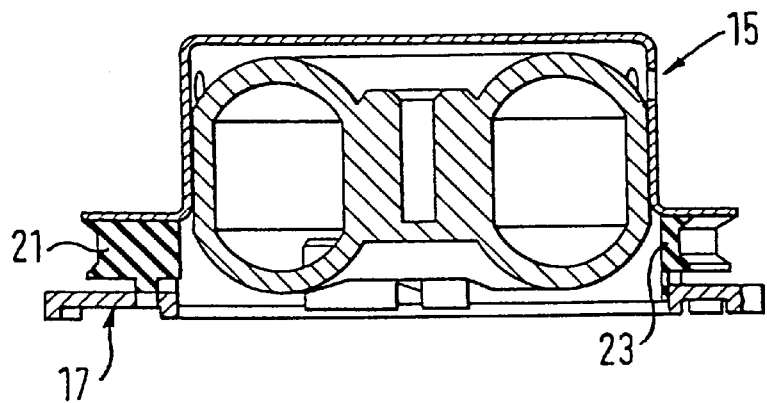
Figure 1D:
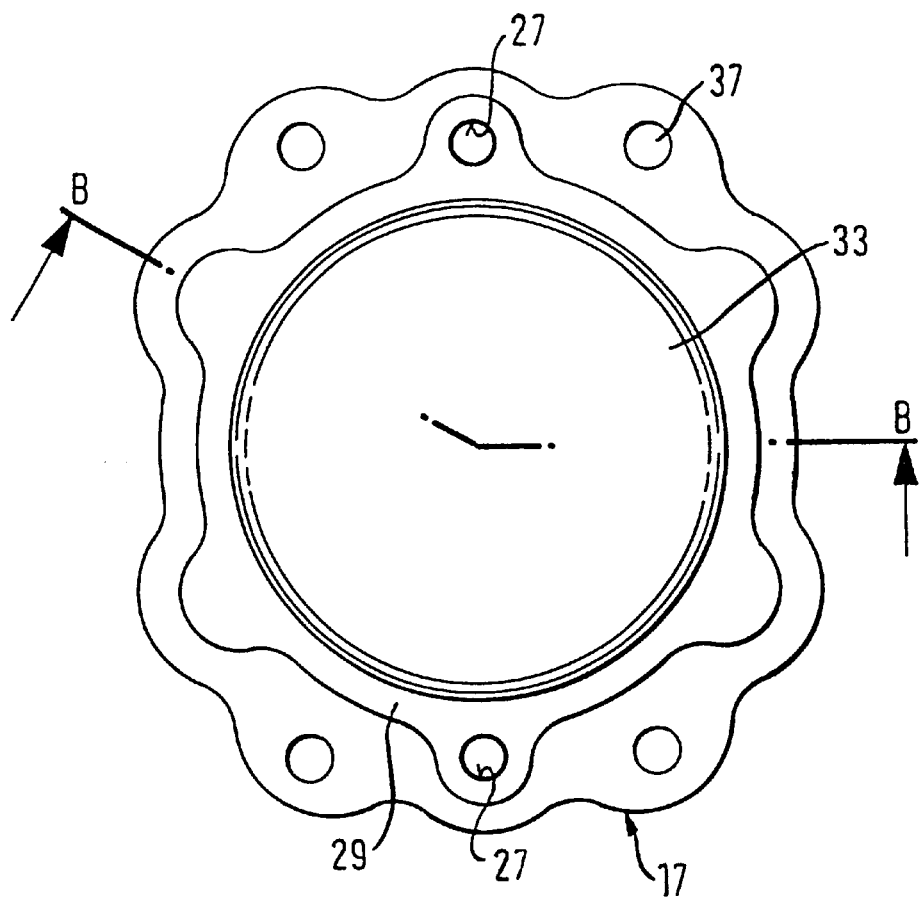
Figure 2A:
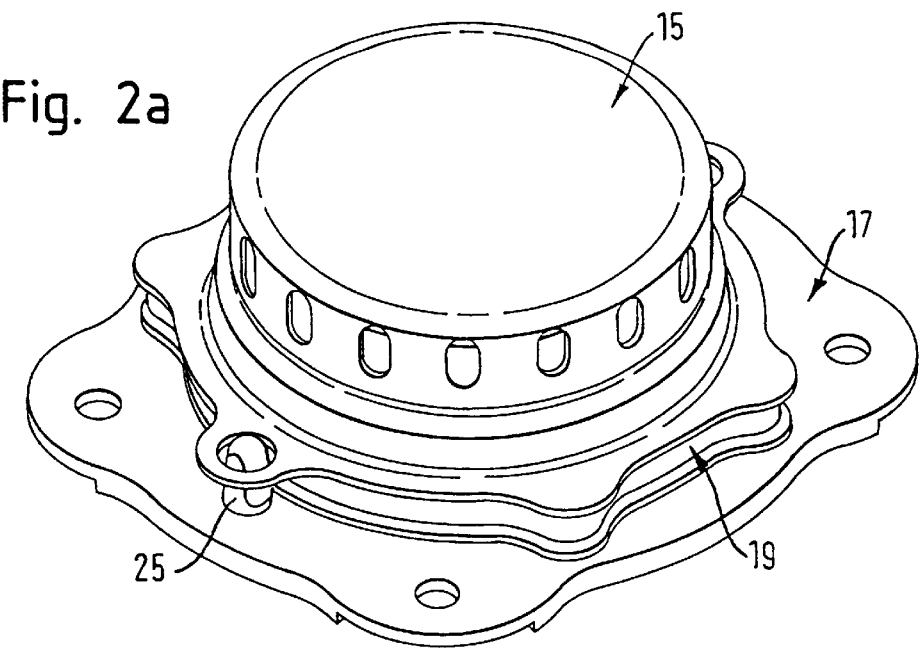
Figure 2B:
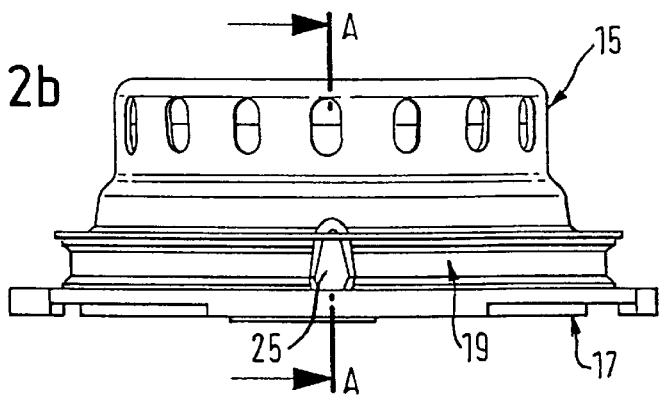
Figure 2C:
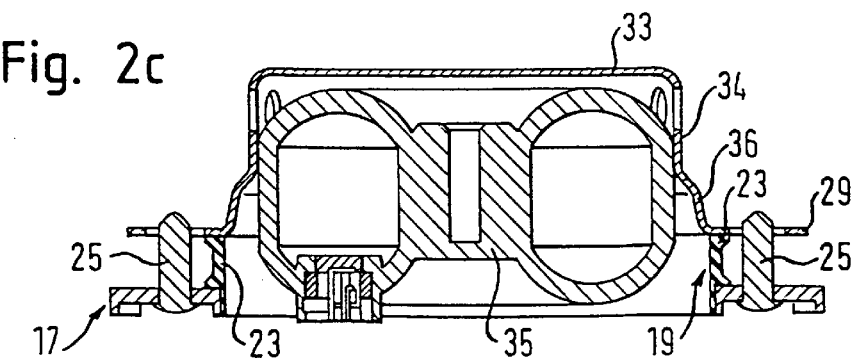
Figure 4:
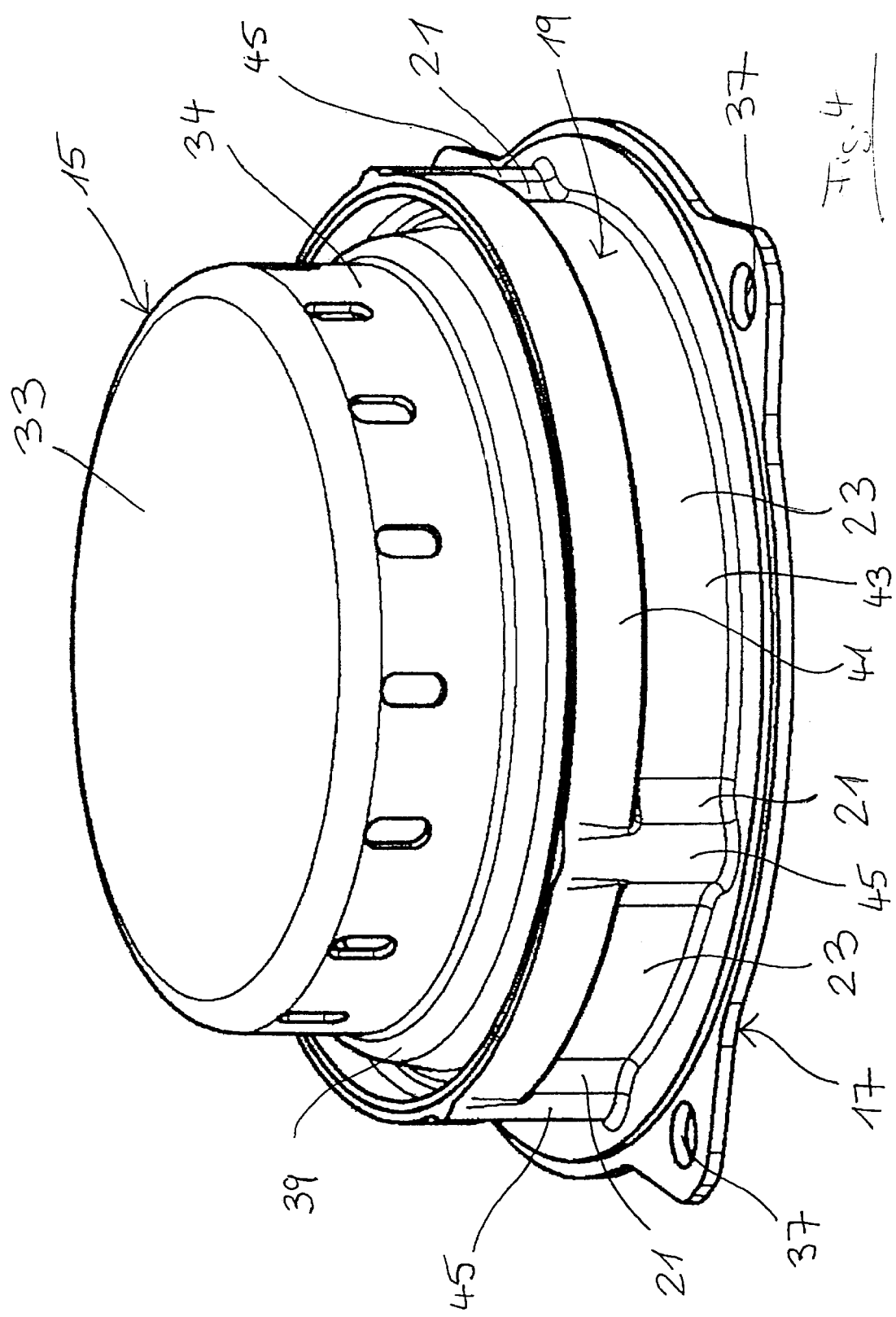

The invention is described in the following by way of example with reference to the drawing, in which are shown:

FIGS. 1a–1e different views of a vibration absorber of an airbag module in accordance with an embodiment of the invention; and FIGS. 2a–2f views in accordance with FIGS. 1a–1e of a further embodiment of the invention, with FIG. 2f corresponding to FIG. 2c and showing additional components of the airbag module;

FIG. 3 a sectioned side view of a vibration absorber of an airbag module in accordance with a further embodiment of the invention; and FIG. 4 a perspective view of the vibration absorber of FIG. 3.

FIGS. 1a–1e show an embodiment of a vibration absorber which comprises a gas generator 15, a base element 17, a coupling element 19 and vibration dampers 25. This unit forms, together with further components (not shown), an airbag module which can be integrated into a steering wheel unit of a motor vehicle. The design of the airbag module will be looked at in more detail in the explanation of a further embodiment of the invention.

The gas generator 15 comprises a circular cylindrical outer part 33 with straight walls, which extend parallel to the longitudinal axis of the airbag module, and with a radially projecting collar 29. A gas generator unit 35 is inserted into the outer part 33 and discharges gas after triggering in the event of an accident. Said gas flows through openings formed in the cylinder wall of the outer part 33 and inflates the folded airbag.

The plate shaped base element 17 provided with a central opening 31 is unreleasably connected to the collar 29 of the outer part 33 via an annular coupling element 19 which is vulcanized on the one hand to the marginal region of the base plate 17 bounding the aperture 31 and on the other hand to the lower side of the collar 29 of the gas generator 15. The coupling element 19 consists, for example, of rubber or a rubber-like material, with, however, other elastic and/or vibration damping materials also being able to be used which are connected in a suitable manner to the gas generator 15 and the base element 17.

The wall thickness of the coupling ring 19 varies over its periphery and comprises contact regions 21 of comparatively large wall thickness, between which sealing regions 23 with comparatively small wall thickness extend. The outer edge of the collar 29 follows the outer contour of the coupling ring 19 to the extent that tab-like protrusions 30 are provided for the connection of the contact bases 21 having an approximately semi-circular contact surface and with which the gas generator 15 contacts the coupling element 19.

Two tabs 30 of the generator collar 29 diametrically opposed to one another are provided with a circular recess 27 into which in each case one pin-shaped vibration limiter 25 engages which is made of an elastic material and in particular of plastic and which is fixed, for example latched or clipsed, to the base element 17 with its end opposing the engagement end.

The limit pins 25 are designed such that they have a greater stiffness than the coupling ring 19.

Openings 37 in the base plate 17 serve the securing of the base plate 17 to a foundation plate of the airbag module.

While it can be seen in particular from FIG. 1b that the limit pins 25, which taper towards the top, protrude through the tab openings, FIG. 1c shows in particular the generator unit 35 inserted into the outer part 33, which is also called a generator flange. The outer part 33 and the generator unit 35 are welded together. The design of the generator unit 35, which can generally be of any form with respect to the invention, is not looked at in any further detail.

While FIG. 1c shows a section along a plane extending through the two limit pins 25, a section along the line B—B of FIG. 1d is shown in FIG. 1e. In particular the different wall thicknesses in the contact regions 21 on the one hand and the sealing regions 23 on the other hand can be seen from FIG. 1e.

The elastic coupling ring 19 has a comparatively high stiffness parallel to the longitudinal module axis, i.e. parallel to the straight side wall 34 of the outer part, and a relatively low stiffness perpendicular to the longitudinal module axis. The gas generator 15 can thus oscillate ideally with respect to its vibration absorption function relative to the base element 17 fixed to the module during the operation of the vehicle when the airbag module is integrated into the steering wheel unit. Lateral movements of the gas generator 15 perpendicular to the module axis are limited by the comparatively stiff vibration limiter 25.

The resonance properties of the system capable of vibration can be set directly in dependence on the respective circumstances and demands by a corresponding selection of the material and, for example, of the composition of the rubber mixture of the coupling element 19.

A substantial advantage of the connection in accordance with the invention of the gas generator 15 to the base element 17 is that, in comparison to a rigid connection between the gas generator and the base element, no disadvantageous compromises have to be made. In particular, neither the installation procedure nor the installation position of the vibration absorber assembly in accordance with the invention are substantially changed with respect to a rigid gas generator unit.

The variant of the invention shown in FIGS. 2a–2f corresponds to the embodiment of FIGS. 1a–1e with the difference that the outer part 33 of the gas generator 15 has no straight side wail 34 but merges into the collar 29 from a straight side wall section via a radially extended sidewall section 36 which as an approximate step shape. The invention can consequently be used without problem with previously designed gas generators 15 and/or outer part 33 of gas generators 15.

FIG. 2f additionally shows, in a representation corresponding to FIG. 2c, a diffuser cap 16 surrounding the gas generator 15 at a spacing whose wall is provided with gas throughflow orifices. A gas inlet space is present between the outer part 33 of the gas generator 15 and the diffuser cap 16, into which gas generated by the generator unit 35 flows before it enters the airbag 13.

The folded airbag 13, which is only schematically indicated in FIG. 2f and which is anchored to the airbag module in a suitable manner, surrounds the diffuser cap 16 and is located inside an outer cover 12 of the airbag module which is a component of the module housing 11.

The cover 12 or the module housing 11 and a foundation plate 14, at which the base element 17, the diffuser cap 16 and/or the cover 12 are secured in a suitable manner, optionally via additional module components, are only indicated schematically in FIG. 2f by chain-dotted lines.

FIGS. 3 and 4 show a particularly preferred embodiment of a vibration absorber which can be manufactured in a particularly simple manner and which nevertheless simultaneously provides a reliable support of the gas generator 15 at the base element 17 and a limitation of radial vibrations of the gas generator 15.

The embodiment in accordance with FIGS. 3 and 4 differs from the embodiments explained above by the design of the collar 29 of the gas generator 15 and by the design of the annular coupling element 19.

The initially straight side wall 34 of the outer part 33 of the gas generator 15 formed as one piece merges via a step-shaped transition section 39 into a free end of the collar 29 which is U shaped in cross-section and which is bent outwardly and upwardly. The circumferential collar 29 is in this manner radially outwardly offset with respect to the side wall 34 by means of the transition section 39. The collar 29 is formed by a deep-drawing process in the manufacture of the outer part 33.

The coupling ring 19 vulcanized onto the base element 17 consists of a lower annular section 43 and an upper annular section 41. The lower annular section 43 is offset radially inwardly with respect to the upper annular section 41, whereby a support step is present for the U shaped collar end of the gas generator 15 at the radial inside of the coupling ring 19.

The coupling ring 19 is molded at its upper annular section 41 and in the region of the support step to the radially outer side wall and to the base section of the U shaped collar end and is fixedly connected by vulcanization to the collar 29. The gas generator 15 is consequently set with its collar 29 into the coupling ring 19 and onto its support step such that the gas generator 15 is supported at the base element 11 via its collar 29 and via the coupling ring 19 and is surrounded over its whole periphery in the region of the radially outer side wall of the collar 29 by the upper annular section 41 of the coupling ring 19. In this way, the coupling ring 19 acts against radial vibrations of the gas generator, in particular via the upper annular section 41, without putting the connection of the collar 29 to the coupling ring 19 at risk.

The wall thickness of the coupling ring 19 varies over its periphery. As shown in particular by FIG. 4, reinforcement regions 45 are distributed over the periphery of the coupling ring 19 and the wall thickness of the coupling ring 19 is enlarged in these with respect to intermediate regions in which the lower annular section 43 forms sealing regions 23. The reinforcements 45 form contact bases 21 for the collar 29 of the gas generator 15 in the region of the lower annular section 43.

An enlargement of the wall thickness with respect to the intermediate regions by the reinforcement regions 45 also takes place in the region of the upper annular sections 41—in comparison with the lower annular section 43 via a smaller angular region. In this way, the coupling element 19 is given increased stiffness not only in the region of the lower annular section 43, but also in the region of the upper annular section 41.

The enlargement of the wall thickness of the coupling ring 19 by the reinforcements 45 is effected exclusively by a radial outward expansion. The insides of the coupling element 19 are free of recesses and elevations.

The reinforcements 45 which are formed in column-like or pillar-like manner, which grow radially outwardly from the annular sections 41, 43, which are mutually offset radially, and which are provided with contact regions 21 which are broadened in the peripheral direction, have a straight outer surface which extends parallel to the axially extending side wall 34.

A reinforcement by radial expansion can alternatively be omitted in the region of the upper annular section 41 which then has a constant wall thickness over the whole periphery.

The upper annular section 41 closes at its edge flush with the radially outer side wall of the collar 29 of the gas generator 15 which has a U shape in cross-section.

What is claimed is:

1. An airbag module for motor vehicles having an inflatable airbag and a gas generator which is connected to a base element fixed to the module in the assembled state, wherein the gas generator and the base element are combined to form an assembly serving as a vibration absorber and are unreleasably connected to one another by at least one elastic and/er vibration damping coupling element via which the gas generator is supported over its area at the base element wherein the coupling element has contact regions distributed in the peripheral direction with a large wall thickness and preferably at least an approximately circular or semi-circular contact area and sealing regions with relatively small wall thickness between the contact regions.

2. An airbag module having a base element and a gas generator, the airbag module comprising:

a coupling element for unreleasably connecting the gas generator to the base element; wherein the coupling element comprises contact regions having a large wall thickness and sealing regions with relatively small wall thickness disposed between the contact regions, wherein the coupling element and the gas generator mutually overlap in the axial direction with respect to a longitudinal module axis.

3. An airbag module for motor vehicles having a housing for an inflatable airbag and a gas generator which is connected to a base element fixed to the module in the assembled state, wherein the gas generator and the base element are combined to form an assembly serving as a vibration absorber and are unreleasably connected to one another by at least one elastic vibration damping coupling element via which the gas generator is supported over its area at the base element wherein the coupling element has reinforcement regions distributed in the circumferential direction in which the wall thickness of the coupling element is enlarged in comparison with regions disposed between the reinforcement regions in particular in the region of an upper and of a lower annular section.

4. An airbag module having a base element and a gas generator, the airbag module comprising:

a coupling element for unreleasably connecting the gas generator to the base element; wherein the coupling element comprises contact regions having a large wall thickness and sealing regions with relatively small wall thickness disposed between the contact regions, wherein the gas generator has a collar for support at the coupling element which is preferably formed at least approximately in a U-shape in cross-section.

5. An airbag module in accordance with claim 4, wherein the collar is arranged in a manner radially outwardly offset and merges in particular via a step-shaped transition section into a side wall of the gas generator which preferably extends axially.

6. An airbag module having a base element and a gas generator, the airbag module comprising:

a coupling element for releasably connecting the gas generator to the base element; wherein the coupling element comprises contact regions having a large wall thickness and sealing regions with relatively small wall thickness disposed between the contact regions, wherein the gas generator has an outer contour which is radially projecting or protruding and is connected to the coupling element.

7. An airbag module in accordance with claim 6, wherein the coupling element is vulcanized both to the gas generator and the base element.

8. An airbag module in accordance with claim 6, wherein the coupling element comprises one or more of rubber or a rubber-like material.

9. An airbag module in accordance with claim 6, wherein the coupling element has a higher stiffness parallel to a longitudinal module axis than perpendicular to the longitudinal module axis.

10. An airbag module in accordance with claim 6, wherein the coupling element has a closed peripheral contour.

11. An airbag module in accordance with claim 6, wherein the coupling element has an annular shape.

12. An airbag module in accordance with claim 6, wherein the coupling element is formed as a radial vibration limiter for the gas generator.

13. An airbag module in accordance with claim 6, wherein the gas generator is inserted into the coupling element and is surrounded at least regionally by the coupling element.

14. An airbag module in accordance with claim 6, wherein the base element is formed in a plate shape and has an opening with the coupling element being connected to its boundary region.

15. The airbag module as in claim 6, wherein the gas generator, the base element and the coupling element form an assembly that is adapted to absorb vibrations encountered by the airbag module.

16. The airbag module as in claim 6, further comprising a pair of vibration limiters disposed between the gas generator and the base element.

17. An airbag module having a base element and a gas generator, the airbag module comprising:

a coupling element for unreleasably connecting the gas generator to the base element; wherein the coupling element comprises contact regions having a large wall thickness and sealing regions with relatively small wall thickness disposed between the contact regions;

a pair of vibration limiters disposed between the gas generator and the base element, wherein said pair of vibration limiters are received in openings in a collar of the gas generator and the openings are opposed to each other.

18. A vibration absorber for an airbag module having a base element and a gas generator, the vibration absorber comprising:

a coupling element for unreleasably connecting the gas generator to the base element; and a pair of vibration limiters disposed between the gas generator and the base element, wherein the gas generator has a collar wherein a portion thereof is U shaped and the coupling element is configured to receive said U shaped portion of said collar.

19. The vibration absorber as in claim 18, wherein said pair of vibration limiters have a greater stiffness than said coupling element.

20. The vibration absorber as in claim wherein 18, wherein the coupling element is vulcanized both to the gas generator and the base element and the coupling element comprises one or more of rubber or a rubber-like material.

21. The vibration absorber as in claim 18, wherein the coupling element has a higher stiffness parallel to a longitudinal module axis than perpendicular to the longitudinal module axis.

22. The vibration absorber as in claim 18, wherein the coupling element is vulcanized to both the gas generator and the base element and the coupling element comprises one or more of rubber or a rubber-like materials.

* * * * *